May 28, 1940.   C. W. BUCKHAM   2,202,138
CAMERA
Filed Nov. 16, 1938   3 Sheets-Sheet 1
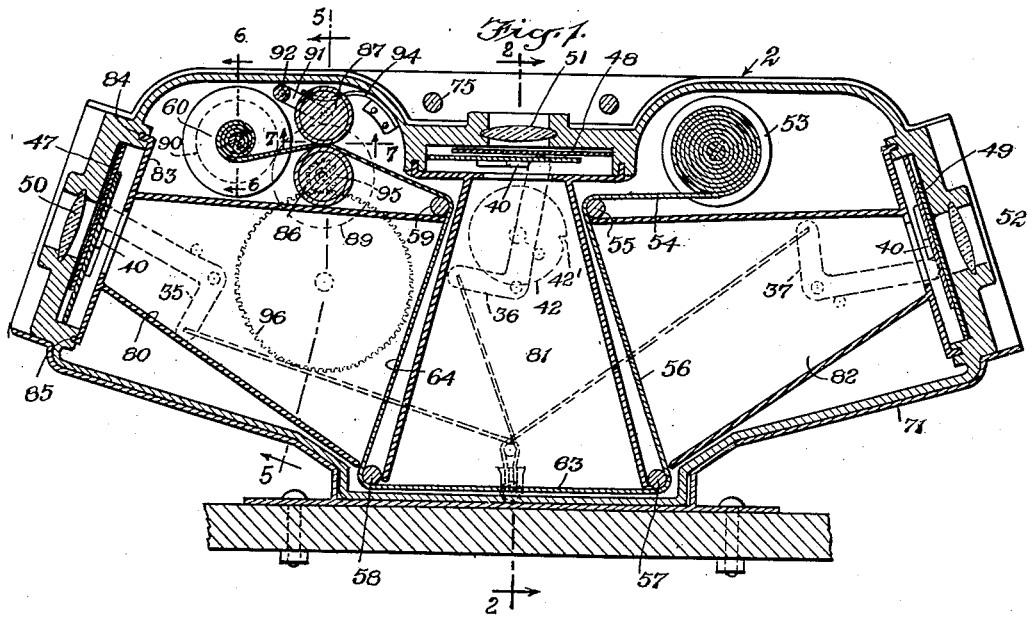
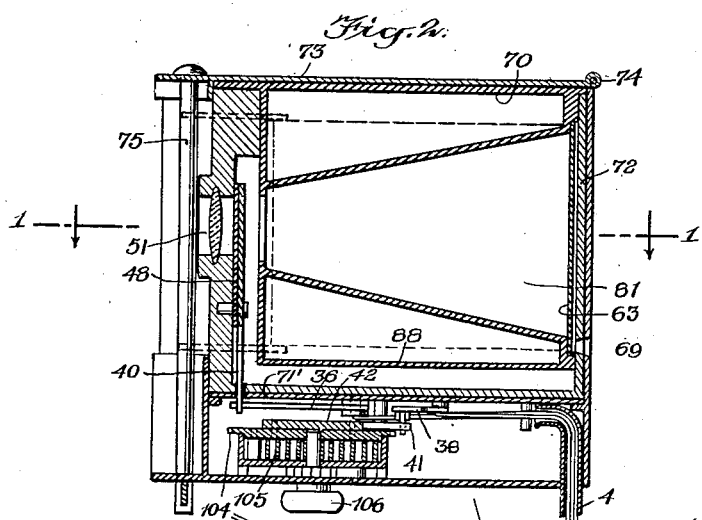
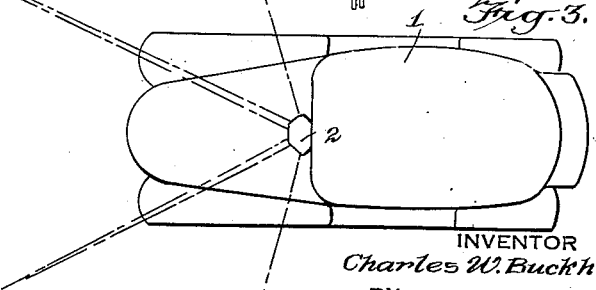
WITNESSES
INVENTOR
Charles W. Buckham
BY
ATTORNEYS May 28, 1940. C. W. BUCKHAM 2,202,138
CAMERA
Filed Nov. 16, 1938 3 Sheets-Sheet 2
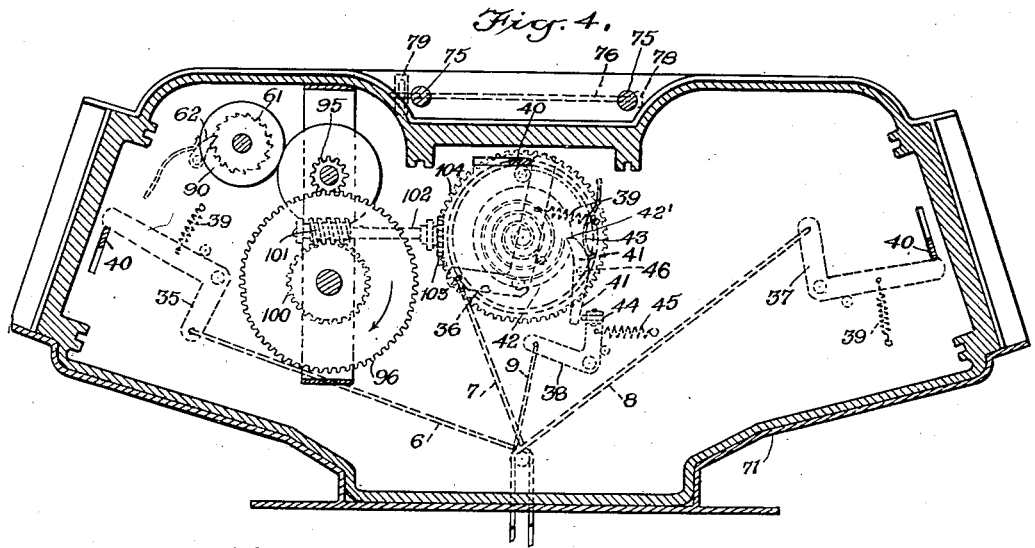
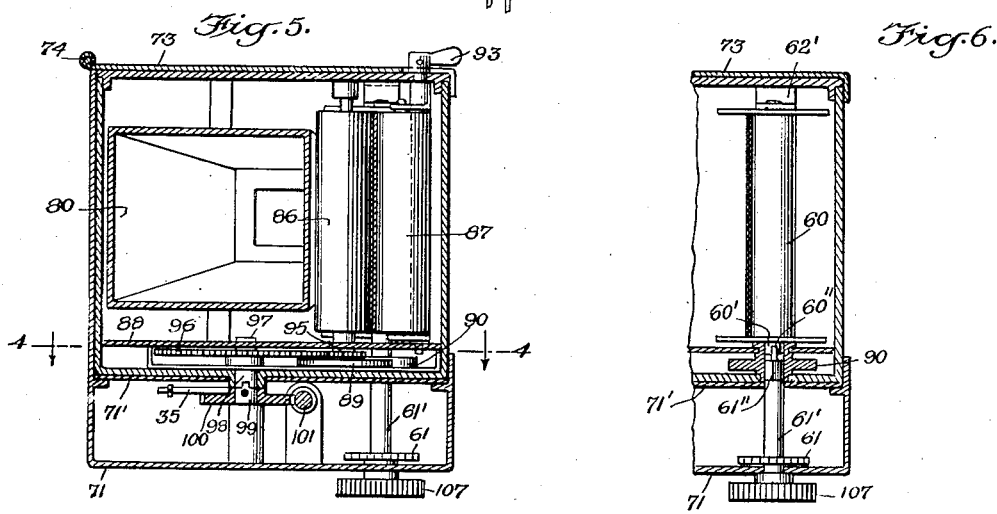
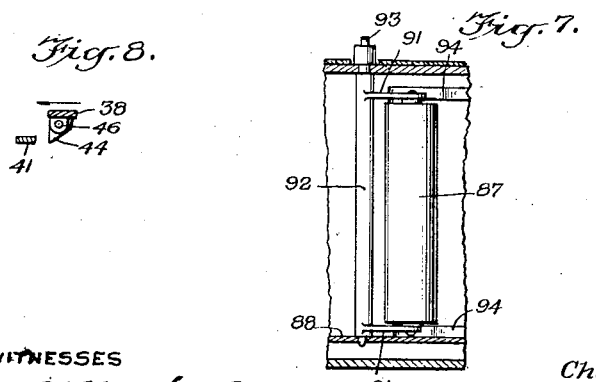
INVENTOR
Charles W. Buckham
BY
Munn, Anderson & Liddy
ATTORNEYS May 28, 1940. C. W. BUCKHAM 2,202,138
CAMERA
Filed Nov. 16, 1938 3 Sheets-Sheet 3
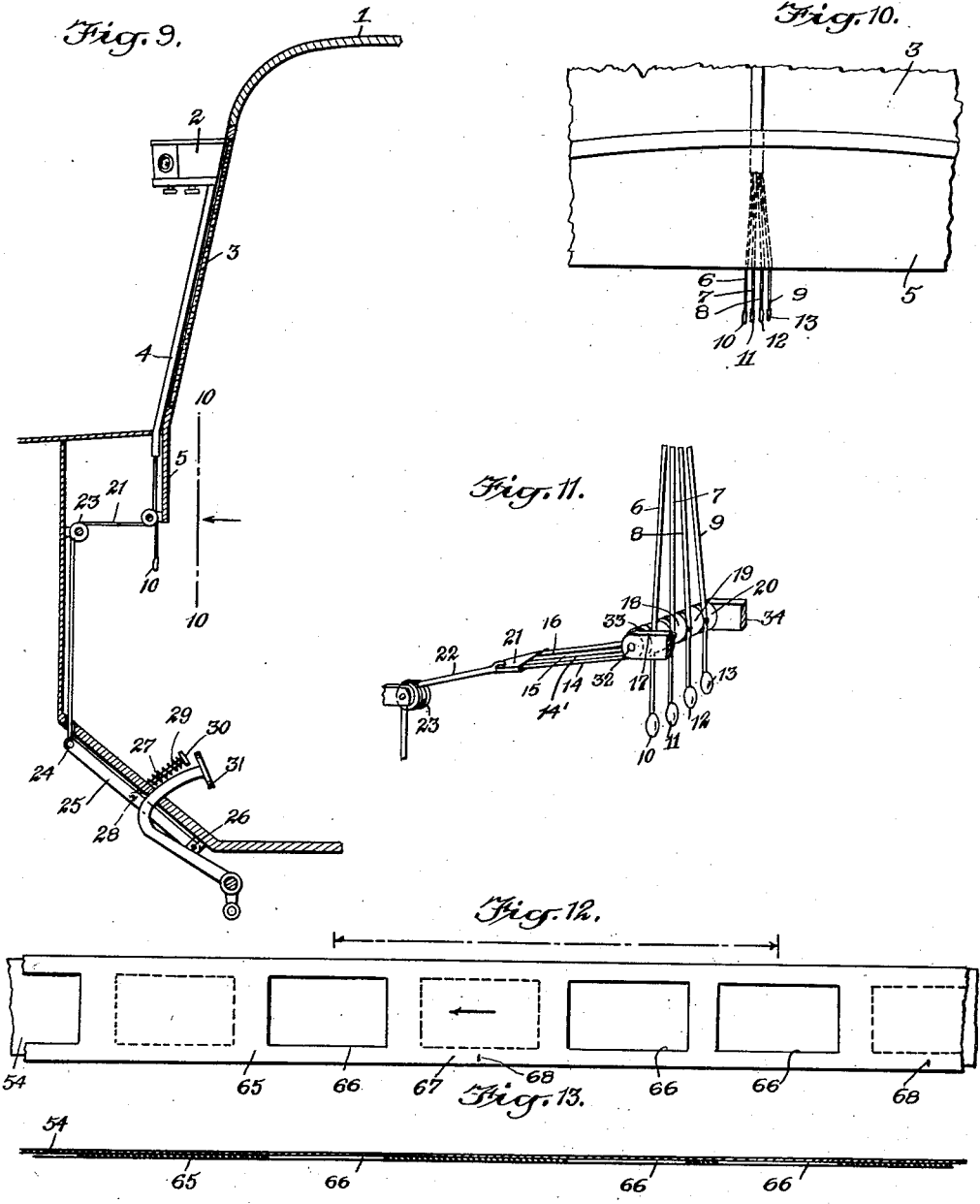
INVENTOR
Charles W. Buckham Patented May 28, 1940

2,202,138

UNITED STATES PATENT OFFICE 2,202,138

CAMERA

Charles W. Buckham, Scarsdale, N. Y.

Application November 16, 1938, Serial No. 240,763

8 Claims. (Cl. 95—18)

This invention relates to cameras and has for an object to provide an improved camera which may be used to take a single picture or a plurality of pictures at the same time.

Another object of the invention is to provide an improved camera which may be used for many purposes, but especially on the front part of an automobile, the structure being such that the camera may be operated for taking a plurality of pictures quickly and automatically upon the application of the brake so as to provide a record in case of an accident or a near accident.

An additional object of the invention is to provide a camera which is adapted to be mounted on the front of an automobile and which may be operated automatically with the brake pedal of the automobile or independently thereof to provide one or a plurality of pictures either at the time of emergency or at some other time.

An additional and more detail object of the invention is to provide an improved camera having a plurality of lenses arranged at angles to each other so as to take a plurality of pictures whenever desired with the views at angles to each other.

In the accompanying drawings—

Fig. 1 is a longitudinal vertical sectional view through Fig. 2 approximately on the line 1—1, the view illustrating one embodiment of the invention;

Fig. 2 is a central sectional view through Fig. 1 approximately on the line 2—2;

Fig. 3 is a top plan view on a reduced scale of an automobile with a camera embodying the invention applied thereto;

Fig. 4 is a sectional view through Fig. 5 approximately on the line 4—4;

Fig. 5 is a transverse sectional view through Fig. 1 approximately on the line 5—5;

Fig. 6 is a detail fragmentary sectional view through Fig. 1 approximately on the line 6—6;

Fig. 7 is a detail fragmentary sectional view through Fig. 1 approximately on the line 7—7;

Fig. 8 is a detail fragmentary sectional view illustrating the arrangement of the coacting ends of the pawl and release lever illustrated in Fig. 4 embodying certain features of the invention;

Fig. 9 is a fragmentary vertical sectional view through the front part of the automobile showing an embodiment of the invention applied thereto and illustrating how the camera may be actuated at the same time the brake is actuated;

Fig. 10 is a detail fragmentary view on the line 10—10 of Fig. 9;

Fig. 11 is a detail fragmentary perspective view showing in detail the arrangement of the pull cables and associated parts illustrated at the central portion of Fig. 9;

Fig. 12 is a side view of a short section of film illustrated in Fig. 1;

Fig. 13 is a longitudinal central sectional view through Fig. 12.

Referring to the accompanying drawings by numerals, 1 indicates an automobile of any desired kind, as for instance a passenger automobile, and to this automobile is connected a camera 2 constructed in accordance with the present invention. This camera is mounted as shown particularly in Figs. 3 and 9, namely, on the front part of the automobile preferably above the windshield 3. A sleeve 4 (Fig. 9) of metal or any other desired material may be connected with the bottom part of the camera and extend downwardly to a point in back of the instrument board 5. This sleeve or pipe carries the four cables 6, 7, 8 and 9, which may be wire, cord, or other material. At the lower end of these cables are arranged knobs 10, 11, 12 and 13 so that any one or all of the cables may be manually pulled downwardly whenever desired by a person within the automobile 1. In addition there are provided cables 14, 14', 15 and 16 connected to cables 6, 7, 8 and 9. These latter cables extend around the various guiding pulleys 17, 18, 19 and 20. A connecting member 21 is secured to one end of all of the cables 14, 14', 15 and 16, as shown in Fig. 11, and also connected to a large and stronger cable 22 which extends over a pulley 23 and then downwardly so as to be secured at 24 to a lever 25. Lever 25 is pivotally mounted at 26 on the automobile 1 and is provided with a rod 27 pivotally connected therewith at 28. A spring 29 surrounds rod 27 and bears against the floor of the automobile 1 and against the head 30 so as to hold the parts normally in the position shown in Fig. 9. The head 30 is slightly at one side of the pedal 31, which is the usual brake pedal of the automobile.

From Fig. 11 it will be seen that the various pulleys 17 to 20, inclusive, are rotatably mounted on a pin 32 which is supported by suitable brackets 33 and 34 secured in any desired manner to the forward face of the instrument board 5.

By reason of this construction the various parts to be actuated in the camera 2 may be actuated individually by a person pulling downwardly on any of the knobs 10 to 13, inclusive. In case of an emergency, as for instance where an accident is imminent or where a very quick stop of the automobile is necessary to avoid an accident, the operator places his foot on the brake pedal 31 to apply the brake to the automobile. In doing this, the foot of the operator extends beyond the pedal 31 and presses on the head 30 so that lever 25 is swung downwardly and the large cable 22 is pulled. This pulls the four cables, namely, cables 6 to 9, inclusive, and causes all parts of the camera to function, whereby a plurality of exposures will be made at one time and also the parts caused to function to reset the film ready for other exposures. As indicated in Fig. 1, the camera is formed to provide three exposures which may be taken individually or simultaneously. One of the exposures is directed toward the front and the other two exposures are directed toward the opposite sides of the automobile but at a slight angle to the front, though the camera could be made to make a side exposure directly at right angles to the center exposure without departing from the spirit of the invention.

As indicated in Fig. 4, when all four cables 6 to 9, inclusive, are pulled by the depression of the head 30, the various levers 35, 36, 37 and 38 will be actuated. The levers 35, 36 and 37 are each yieldingly held by suitable springs 39 in a non-functioning position ready, however, to permit the shutter lever 40 to function to cause an exposure. The levers 35, 36 and 37 function simultaneously when cable 22 is pulled and, consequently, three exposures will be taken at one time. At the same time that the levers just described function, lever 38 will begin to function and will swing over to move the pawl 41 away from the notch 42' (in plate 42) against the action of the spring 43. The cables extend to the short ends of the bell crank levers 35, 36 and 37 so that their long ends will cause the shutter levers to function before the bell crank lever 38 can release the pawl 41. It will be understood that the parts are properly proportioned to secure this result and that the pawl 41 is released immediately after the shutters function. As shown in Fig. 8, the short end of the lever 38 is provided with a swingable abutment 44 which strikes the pawl 41 near the outer end and swings this pawl for releasing the same. As the two levers swing together the swingable abutment 44 will eventually pass and slip off the lower end of pawl 41, whereupon pawl 41 will quickly snap back to its former position under the action of spring 43. As soon as lever 39 is released it will be moved back under the action of spring 45 and in moving back the free end 41' of pawl 41 will swing on its pivot 46 and pass over the end of pawl 44 so as to be ready for a second actuation.

It will be understood that the shutter levers 40 are associated with conventional shutters 47, 48 and 49, which are not shown in detail as the structure of the shutters forms no part of the present invention. These shutters are arranged immediately back of the respective lenses 50, 51 and 52, which lenses are properly focused so as to provide a proper image on the film arranged in back thereof.

From Fig. 1 it will be seen that the spool 53 supplies the film which is being used. As indicated in this figure, the film 54 passes over a roller or guiding pin 55 so as to expose a section 56 in proper position to receive an image through the lens 52 when the shutter 49 is caused to function. This film 54 also extends around the guiding rollers or pins 57, 58 and 59 so that the end of the film opposite that carried by the spool 53 is adapted to be wound on a spool 60. This spool is provided with a ratchet wheel 61, as shown in Fig. 4, held against reverse rotation by a spring-pressed pawl 62. Referring again to Fig. 1, it will be seen that the section or portion 63 of the film is arranged opposite the lens 51, while the section 64 of the film is arranged opposite the lens 50. In view of this arrangement all three shutters may be actuated at the same time and, consequently, three pictures are taken at one time. Also, as hereinafter more fully described, each shutter may be actuated independently so that either a front or a right or left picture may be taken. Ordinarily a film for a camera has the sensitized solution or gelatine on one surface only but in the present instance the film 54 is sensitized on both surfaces and then one surface is partly covered by a sheet of opaque paper 65, as shown in Figs. 12 and 13. If desired, however, the film could be sensitized on both sides only at certain zones properly positioned to be properly exposed to light from the respective lenses when the marks 68 are properly positioned.

Referring to Figs. 12 and 13 it will be seen that there are provided cutouts 66 suitably grouped and solid sections 67 suitable grouped, so that when the camera is first loaded and one of the indicating marks 68 is brought opposite the window 69, there will be a cutout 66 exposing the face of the film 56 to the lens 52 and a cutout exposing the face of the film 64 facing the lens 50, while the solid section 67 is in back or on the opposite side of the film to the lens 51. The entire film is provided with a covering sheet of opaque paper or other material 65, which sheet of paper is provided with suitable cutouts as just described for the full length of the film, which may provide any desired number of exposures according to the size of the parts and the length of the film.

It will be observed that the pins 55, 57, 58 and 59 are all carried by the inner casing 70, which is slid into the outer casing 71, and the outer casing is bolted or otherwise secured to the automobile 1. As shown particularly in Fig. 1 at the bottom, front and rear there is provided what may be termed an intermediate casing 72, which is bodily removable from the outer casing independently of the inner casing 70. A lid or cover 73 is hinged at 74 to the outer casing 71 and is held in place by the respective pins 75, which at their lower ends are connected by a flat pin 76. This pin 76 has a head 78 at one end and a lock 79 at the other end, which lock may be merely a cotter pin or a padlock as preferred.

When it is desired to remove the film and reload the device, the lock 79 is removed and also the pin 75. The lid or cover 73 is then swung backwardly out of the way and the inner casing 70, which may be termed a focusing box, is first removed. This box or inner casing is provided with focusing chambers 80, 81 and 82. Each of these chambers is provided with an end plate 83 having an annular flange 84 fitted into a suitable groove 85 surrounding the respective lenses. When the inner casing 70 is removed it carries with it the respective spools 53 and 60, as well as the driving drum 86 and idler drum 87. As shown in Figs. 5 to 7, inclusive, the driving drum 86 extends through a division wall 88 and is rigidly secured to a friction wheel 89 continually engaged by a friction wheel 90 secured to the shaft of the spool 60, so that whenever the drum 86 functions it will tend to rotate the spool 60. The idler drum 87 is pivotally supported by arms 91 from a rock shaft 92 having a hand lever 93. When rock shaft 92 is swung in one direction it will move the idler drum 87 away from drum 86 against the action of spring 94. The friction produced by idler drum 87 is to press the film 54, with its covering sheet 67, sufficiently against the drum 86 to feed or pull the film a predetermined distance whenever the pawl 41 is released. This distance is sufficient to provide a new exposure surface for each of the lenses 50, 51 and 52. The driving drum 86 has a pinion 95 rigidly secured thereto and this pinion is continually in mesh with a large gear wheel 96. Gear wheel 96 is rigidly secured to a shaft 97 carrying a clutch 98 (Fig. 5) so as to engage a suitable clutch 99 on a worm wheel 100. A worm 101 continually meshes with the worm wheel 100 and this worm wheel is driven by a shaft 102 (Fig. 4) to which a pinion 103 is rigidly secured, said last mentioned pinion continually meshing with a gear wheel 104 connected with a spring motor 105 which is wound manually by a thumb member 106. This motor is provided with the plate 42 in which the notch 42' is formed for receiving one end of the pawl 41 when the parts are stationary. When pawl 41 is moved from notch 42' the spring motor 105 will begin to rotate gear wheel 104 and will rotate this for one revolution whereupon the pawl 41 will begin to snap back into the notch 42' and stop the rotation. This will provide power for rotating the worm 101, worm wheel 100 and shaft 97, gear wheel 96 and pinion 95.

The above-mentioned arrangement causes the driving drum 80 to always rotate the same number of revolutions each time that it functions and, consequently, to pull the film 54 the same distance each time. As the drum 86 functions the friction gear 90 operates the friction gear 89 and rotates the spool 60 a proper distance for winding the film thereon. When there is a very small amount of film on the spool 60 the rotation of the friction gears is just sufficient to properly wind the slack of the film, but when a considerable amount of film has been wound on the spool 60 the slack will be wound on the spool and then the friction gears will slip in respect to each other so that the drum 86 will rotate the same number of revolutions. In this way the film 54 is pulled the same distance each time that the pawl 41 is released. The spring motor 105 is of sufficient size and strength to actuate the parts until the entire film has been used, but when a new film is provided it will be necessary to rewind the motor 105. If desired, some other form of prime mover could be provided instead of a spring motor, as for instance, an electric motor, and if an electric motor were provided a rewinding would, of course, not be necessary, but the motor would always be in functioning position as long as current was provided.

When a new film is being inserted the end is wound slightly on the spool 60, as shown in Fig. 1. This is accomplished manually be operating the thumb member 107, as shown in Fig. 6. This member carries the ratchet wheel 61 and a key shaft 61' that has a squared end 61'' fitting into a square bore in the friction drum 90. By this means the spool 60 may be rotated to the desired extent for pulling the film around into correct position so that one of the indicating marks 68 (Fig. 12) will come opposite the sight opening 69 (Fig. 2). By reason of the sliding connection of the squared portion 61' and the clutch 99, the inner casing 70 may be removed without disturbing the friction wheel 90 and the driving mechanism connected therewith, or without disturbing the levers 35, 36 and 37 and associated parts.

When the camera is in full functioning position, as shown in Fig. 1, an exposure may be made on either side of the automobile or directly in front. For instance, if the knob 12 in Fig. 11 were pulled a right-hand exposure would be made, as shown in Fig. 1. If the knob 11 were pulled a central exposure would be made as illustrated in Fig. 1. If the knob 10 were pulled a left-hand exposure would be made, as shown in Fig. 1. If the knob 13 were pulled, the pawl 41 would be released and the motor 104 would function to supply a new zone on the film ready to take three more exposures.

This manner of using a camera permits the driver or other operator to secure single pictures whenever desired. However, if it should be desired to take three pictures at one time for any reason except an accident or near accident, the operator would merely place his foot on the head 30 of rod 27, as shown in Fig. 9, and all the cables shown in Fig. 11 would be pulled so that there would be three exposures made simultaneously and the pawl 41 released to permit the motor to move the film to a second setting. In this way three desired pictures could be secured of the scenery for the purpose of record or pleasure.

In case an accident was about to occur or the driver believed that an accident was imminent, he would place his foot quickly on the brake pedal 31 and allow a portion of his foot to overlap the head 30. By pressing down on the foot pedal to stop the automobile the rod 27, lever 25 and associated parts would be operated for pulling all the cables so that three pictures would be immediately taken and the camera would be automatically reset so that if a second set of pictures were desired the head 30 would be depressed and the second set of pictures would be taken. In this way pictures of the scene of an accident just before the occurrence, or at the time of occurrence, would be taken and, if desired, three pictures could be taken immediately after the accident if the driver or other person in the automobile had the presence of mind sufficiently to depress the head 30.

It will be seen, therefore, that the camera lends itself to making a record of accidents or near accidents which might be useful in court for settlement of claims, or the camera could be used solely for purposes of record or pleasure to take pictures as the automobile moves along over a given course.

It will be evident that after all the film has been used it will be necessary to swing the cover 73 out of the way and remove the exposed film and then insert a new film if it is desired to use the camera again. In case a set of pictures is taken immediately before or exactly at the time of an accident, the exposed part of the film would be wound on a spool 60 and would remain as evidence even though the camera was broken, provided it would not be broken in a way to expose to light the spool 60.

In regard to the casing 71, it will be evident from Fig. 1 that this casing is permanently secured to the automobile. However, the inner casing 70 and the intermediate casing 72 may be removed together and the camera used as an ordinary hand camera. When this is done the various shutter levers 40 must be actuated by hand. Also the film must be wound by hand. It will also be evident that if desired the inner casing 70 could be removed without removing the intermediate casing 72, though ordinarily both casings are removed at the same time. These two casings may be connected together in any suitable way, as for instance by friction.

As shown in Fig. 2, the various shutter arms or levers 40 extend through the auxiliary casing 70 and also through a suitable aperture in a division plate 71', which is connected to and forms part of the casing 71. The hand winding shaft 61', as shown in Fig. 6, extends through the plate 71' so that the square part 61'' will properly interlock with the hub of member 90. A flat extension 60'' projects from the square part 61'' and extends into a slot in the shaft 60' of the roller 60. This arrangement is to permit the wheel 107 to rotate roller 60 and, at the same time, permit roller 60 to be removed whenever desired. A flat spring 62' holds the roller 60 in functioning position. Spring 62' is preferably provided with an aperture so that the end of shaft 60' of roller 60 may extend therethrough.

I claim:

1. A camera of the character described comprising an outer casing adapted to be secured to a support, an independent removable inner casing forming a plurality of diverging focusing chambers, an intermediate casing adapted to support a lens and shutter mechanism in line with one end of each of said chambers, means for guiding and holding in place a film across the inner end of each of said focusing chambers, a lever for causing each of said shutter mechanisms to function, and an independent cable connected to each of said levers whereby when any of said cables is pulled a shutter will be caused to function and when all of said cables are pulled simultaneously all of said shutters will function simultaneously.

2. A camera of the character described including a central lens, a pair of side lenses, means forming a focusing chamber for each of said lenses, the side lenses making an exposure substantially at diverging angles to the central lens, means for holding a film in place across the inner end of each of said chambers, and manually actuated means for individually and simultaneously causing the shutters of the respective lenses to function.

3. A camera of the character described comprising a casing, a central lens, a pair of side lenses, a shutter mechanism for each of said lenses, means forming a focusing chamber for each of said lenses, one of said chambers being centrally positioned and pointing forwardly while the other or side chambers point in diverging directions from said central chamber, means for supporting a roll of film sensitized on both sides, a spool on which said film is adapted to be wound, a pair of drums for moving said film and unwinding the same on said spool, means for guiding the film so that one sensitized surface thereof will be exposed at the inner ends of the respective side chambers and the opposite surface will be exposed at the inner end of said central chamber simultaneously, means for actuating the shutters simultaneously, and hand-actuated means for actuating each shutter mechanism independently.

4. A camera of the character described including a plurality of lenses facing in different directions, shutter mechanism for each of said lenses, means forming a focusing chamber opposite each of said lenses, a spool for supplying a film, a spool on which said film is adapted to be wound from time to time, means for guiding the film from the first-mentioned spool to the second-mentioned spool so as to expose areas of the same at the respective inner ends of said chambers, a pair of friction drums acting on opposite surfaces of said film immediately before the film reaches said second-mentioned spool for moving said film, a prime mover for rotating said drums, means for causing said prime mover to rotate the drums the same amount each time, means extending from a point exterior of the camera for causing the respective shutters to function, and means extending exterior of the camera for releasing the means which holds said prime mover against functioning.

5. A camera of the class described including a lens, a shutter mechanism arranged opposite the lens, means forming a focusing chamber arranged opposite the shutter mechanism, means for guiding a film from the source of supply past the inner end of said focusing chamber, a winding spool for said film, a pair of friction drums for pulling said film the same distance each time the drums are caused to function, means for transmitting motion from said drums to the winding spool so that the winding spool will function each time the drums function, a prime mover, a train of gears for transmitting motion from said prime mover to one of said winding spools, a notched plate connected to said prime mover, a spring-pressed pawl normally extending into the notch in said notched plate, means extending to a point exterior of the camera for causing the pawl to swing out of said notch to release the prime mover, said pawl automatically moving back into the notch after one rotation of said notched plate, and means for actuating said shutter mechanism, said means including a cable extending to a point exterior of the camera.

6. A camera of the character described including a plurality of lenses facing in different directions, the central lens facing forwardly and the two side lenses facing in diverging directions, a shutter for each lens, means forming a focusing chamber for each lens, means for guiding a film past the inner end of said focusing chambers, said film being provided with a strip sensitized on both sides and an opaque strip formed with windows therein, said windows being spaced so that the said focusing chambers will have one side of said strip exposed at the inner ends thereof while the opposite side of said film will be exposed in the central focusing chamber, manually actuated means for actuating said shutters, power-actuated means for moving said film, and manually actuated structure for causing the power actuated means to function.

7. A camera of the character described including a central lens, a pair of side lenses, means forming a focusing chamber for each of said lenses, the side lenses making an exposure substantially at diverging angles to the central lens, means for holding a film in place across the inner end of each of said chambers, manually actuated means for individually and simultaneously causing the shutters of the respective lenses to function, and power actuated means for resetting said film immediately after each actuation of said shutters.

8. A camera of the character described including a plurality of lenses facing in different directions, shutter mechanism for each of said lenses, means forming a focusing chamber opposite each of said lenses, a spool for supplying a film, a spool on which said film is adapted to be wound from time to time, means for guiding the film from the first-mentioned spool to the second-mentioned spool so as to expose areas of the same at the respective inner ends of said chambers, a pair of friction drums acting on opposite surfaces of said film immediately before the film reaches said second-mentioned spool for moving said film, a prime mover for rotating said drums, means for causing said prime mover to rotate the drums the same amount each time, means extending from a point exterior of the camera for causing the respective shutters to function, and means functioning to release the means which holds said prime mover against functioning immediately after each actuation of said shutters.

CHARLES W. BUCKHAM.